US012253242B1

(12) United States Patent
Rashidi Doust

(10) Patent No.: US 12,253,242 B1
(45) Date of Patent: Mar. 18, 2025

(54) TRACK SYSTEM FOR LIGHTING

(71) Applicant: Elite Lighting, Commerce, CA (US)

(72) Inventor: Hamid Rashidi Doust, Beverly Hills, CA (US)

( * ) Notice: Subject to any disclaimer, the term of this patent is extended or adjusted under 35 U.S.C. 154(b) by 0 days.

(21) Appl. No.: 18/640,943

(22) Filed: Apr. 19, 2024

Related U.S. Application Data

(60) Provisional application No. 63/529,340, filed on Jul. 27, 2023, provisional application No. 63/461,103, filed on Apr. 21, 2023.

(51) Int. Cl.

| | |
|---|---|
| ***F21V 21/35*** | (2006.01) |
| ***F21V 21/02*** | (2006.01) |
| ***F21V 21/10*** | (2006.01) |
| ***F21V 21/30*** | (2006.01) |
| ***F21V 23/00*** | (2015.01) |
| ***F21V 23/06*** | (2006.01) |

(52) U.S. Cl.
CPC .............. *F21V 21/35* (2013.01); *F21V 21/02* (2013.01); *F21V 21/30* (2013.01); *F21V 23/002* (2013.01); *F21V 23/008* (2013.01); *F21V 23/06* (2013.01); *F21V 21/10* (2013.01)

(58) Field of Classification Search
CPC .......... F21V 21/35; F21V 21/02; F21V 21/30; F21V 21/10; F21V 23/002; F21V 23/008; F21V 23/06
See application file for complete search history.

(56) References Cited

U.S. PATENT DOCUMENTS 6,231,205 B1 * 5/2001 Slesinger ............... A47B 97/00
362/225

OTHER PUBLICATIONS https://iuseelite.com/tension/, <acessed Aug. 20, 2024>, published Dec. 22, 2022.

* cited by examiner

*Primary Examiner* — Mary Ellen Bowman
(74) *Attorney, Agent, or Firm* — Payam Moradian

(57) ABSTRACT

Provided is a track system to support light fixtures comprising: a track having a length of less than 100 feet; an electrical conductor running along the track; two ends, each end placed at one end of the track, and configured to be attached to a support to suspend the track; wherein the track is configured for attachment of light fixtures and delivery of electricity to the light fixture though a connection with the electrical conductor.

19 Claims, 9 Drawing Sheets

TRACK SYSTEM FOR LIGHTING

CROSS-REFERENCE

The present application claims the benefit of provisional application No. 63/529,340, filed on Jul. 27, 2023, and provisional application No. 63/461,103, filed on Apr. 21, 2023, both of which are incorporated herein by reference in their entirety.

BACKGROUND SECTION OF THE INVENTION

It is desirable to put luminaries in different locations. A problem with placement of luminaries is that they require wiring and modification to the ceiling. There is a need in the art for placement of luminaries in different combinations as desired without modification to the ceiling and with flexibility as to location of the luminaire.

SUMMARY OF THE INVENTION

Provided is a track system to support light fixtures comprising: a track having a length of less than 100 feet; an electrical conductor running along the track; two ends, each end placed at one end of the track, and configured to be attached to a support to suspend the track; wherein the track is configured for attachment of light fixtures and delivery of electricity to the light fixture though a connection with the electrical conductor. The track system can include a total of two covers, one cover for each end. The cover can have a body portion and a cap portion connected to each other with a plurality of ridges. Each end can include a metal bracket. Each bracket can have an opening for passage of a wire. The track can be made from ABS (Acrylonitrile butadiene styrene) on an outside and stainless-steel strip inside. The system can include a slider configured to be positioned along the track, the slider further comprising a complementary conductor to the electrical conductor of the track. The system can include a connector attached to the slider for attaching a light fixture. The light fixture can be attached directly to the track. The track can have two slots on each side, with a first and a second electrical conductor running on each slot. The track can comprise a receiver at the end configured for spherical movement. The track system can include a receiver at the end configured for spherical movement. The track system can include a junction box for housing a driver, the junction box placed outside of the ends of the track. The system can include a wiring housing inside of the cover. The electrical conductor can include flat copper wire, with a thickness of less than 2 mm and a width (horizontal to track) of less than two inches. The track can have two slots, with conductors running along both slots.

Provided is a track system to support light fixtures comprising: a track having a length of less than 100 feet and having two slots; an electrical conductor running along the two slots of the track on opposite sides of the track; two ends, each end placed at one end of the track, each end having a spherical member to allow for movement; one or more sliders, the sliders configures to slide on the track and make an electrical connection with the track; a total of two covers, one cover for each end. The cover can have a body portion and a cap portion connected to each other with a plurality of ridges. The track system can include a junction box attached to the one of the two ends of the track system on opposite side of a wall. Each end can include a metal bracket.

DETAILED DESCRIPTION OF THE INVENTION

Provided is a track system configured to be attached on both ends to wall 6. Track 1 allows for attachment of plurality of differently shaped luminaries, all of which can receive power from track 1.

Figure 1:
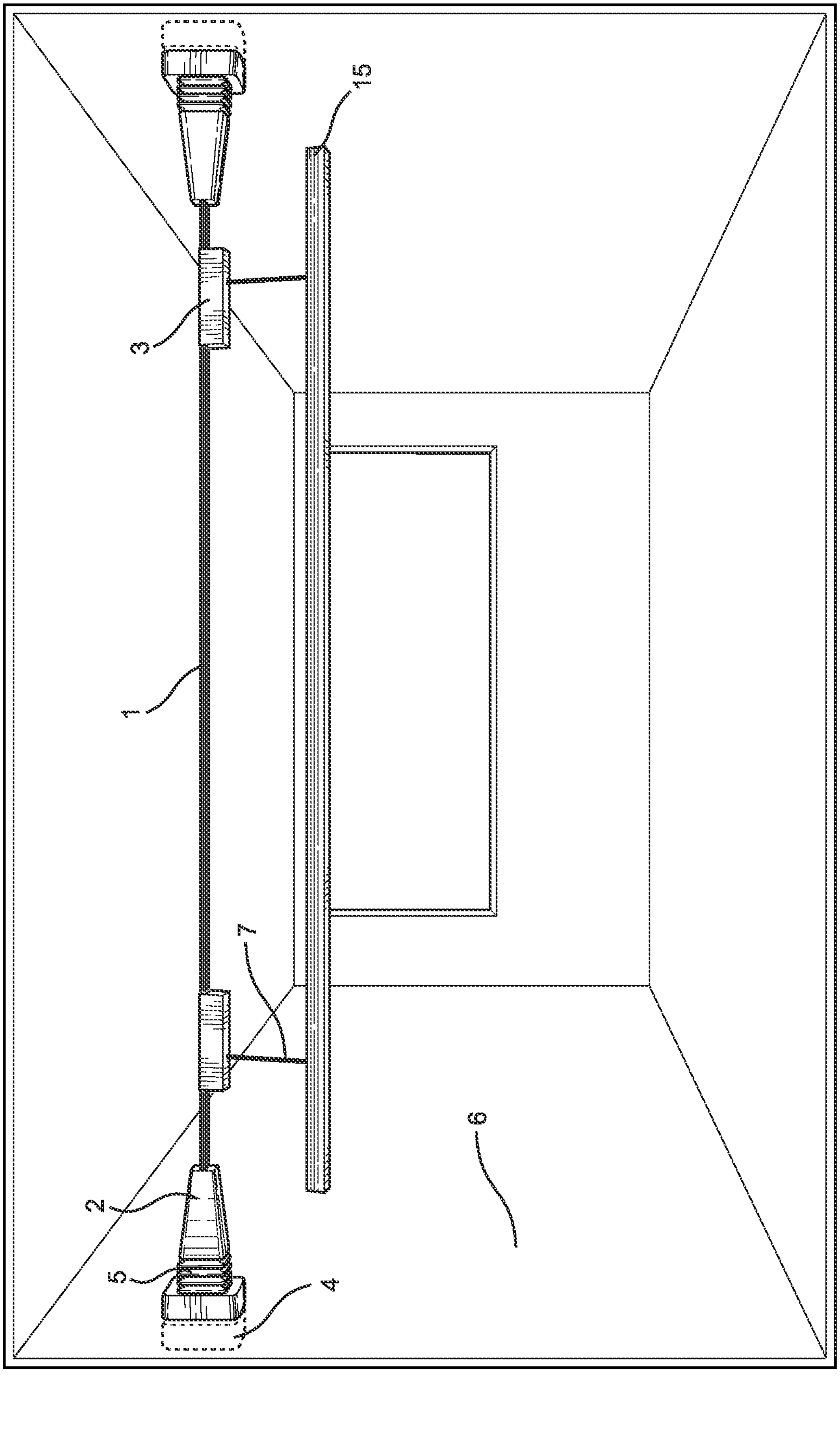
FIG. 1 illustrates suspended track attached to walls at opposite ends

FIG. 1 illustrates suspended track 1 attached to wall 6 at opposite ends. Track 1 can have a cover 2 at each end. Cover 2 can have ridges 5 that allow for flexibility. A junction box 4 can be attached to one or both ends of the track system on the inside of the wall 6.

A light fixture, such as light fixture 15, can be attached directly to track 1 or indirectly with connector 7. Connector 7 can be a wire, with an insulating support on the outside and a copper wire on the inside to carry electricity on the inside. connector 7 suspends the light fixture 15. Sliders 3 can slide against track 1 and be positioned at a suitable location. An electronic connection for transfer of power is made between track 1 and slider 6.

Different types of light fixtures (luminaires) can be attached to track 1. FIG. 1 illustrates a Tension 48V Track Series, Diffused 44" light attached to track 1. The light fixture 15 is attached with two sliders 3 which slide through the end of track 1 and are positioned at any point on track 1 desired by the user.

Figure 2:
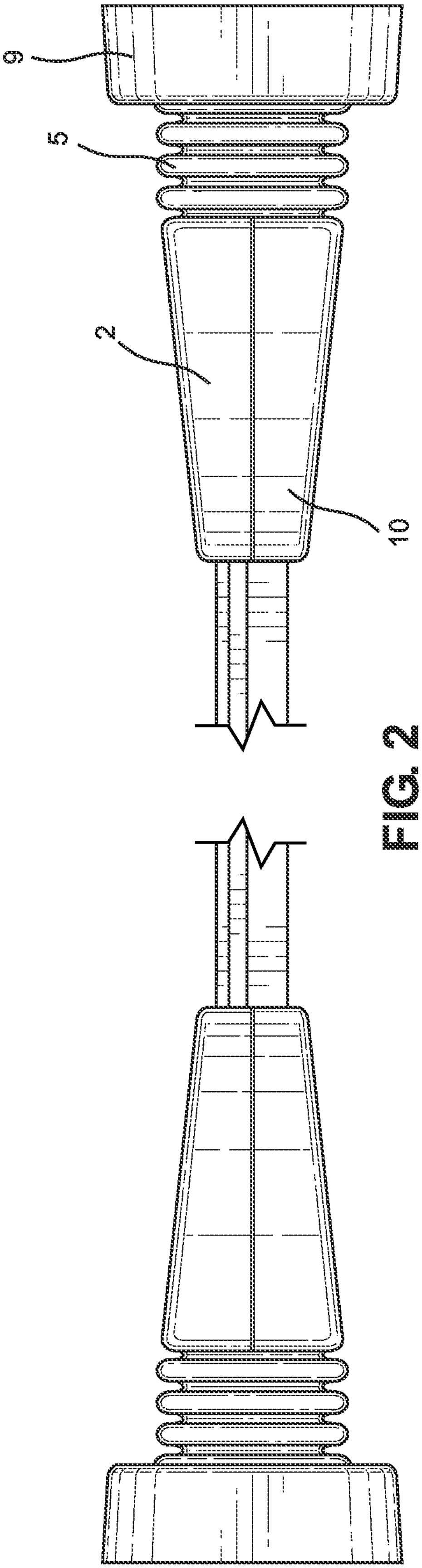
FIG. 2 illustrates the cover placed at the end of track.
Figure 3:
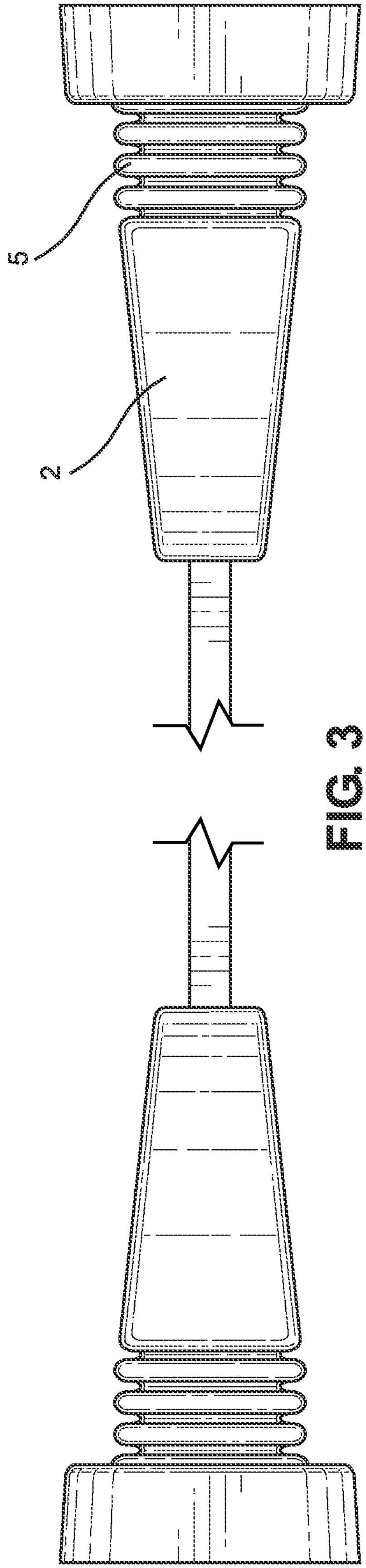
FIG. 3 illustrates the cover placed at the end of track.

FIGS. 2 and 3 illustrate cover 2 that are placed at the end of track 1. The cover 2 has a body 10 and cap 9, which are connected to each other with ridges 3. Ridges 3 can move slightly (straight or at an angle) depending on the applied tension, and provide some flexibility to cover 2.

Figure 4:
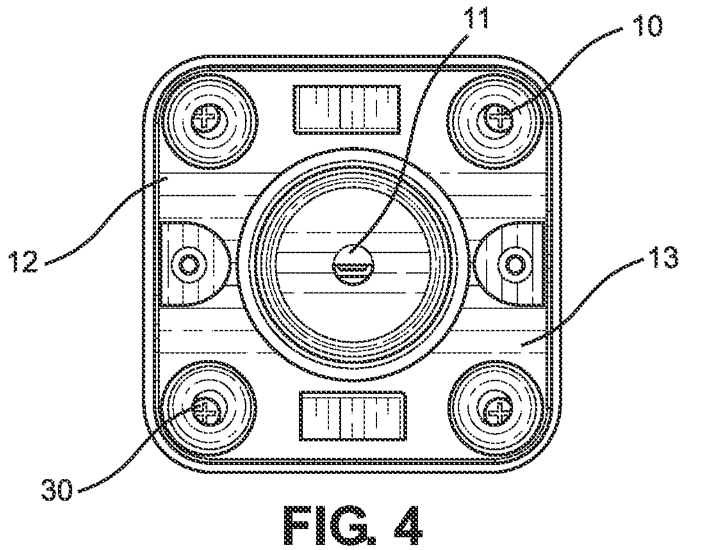
FIG. 4 illustrates the bracket placed at end of the track.

FIG. 4 illustrates the bracket 13 of the track system. The track system can have identical ends 12. The bracket 13 has four fasteners 30 for attaching each of the track 1 to a wall 6. An opening 11 in the center of bracket 13 allows for passage of wires carrying power. Each end 12 can be in form of a metal bracket 13, made from aluminum or steel. Bracket 13 has fastener opening 10 for fastener 30.

Both sides of the track system are attached to a solid beam or stud to maintain stability. Track system brackets 13 are attached on each side to a solid beam or post (beam or post of 2" or greater thickness) using the four fasteners (screws) 30.

Figure 5:
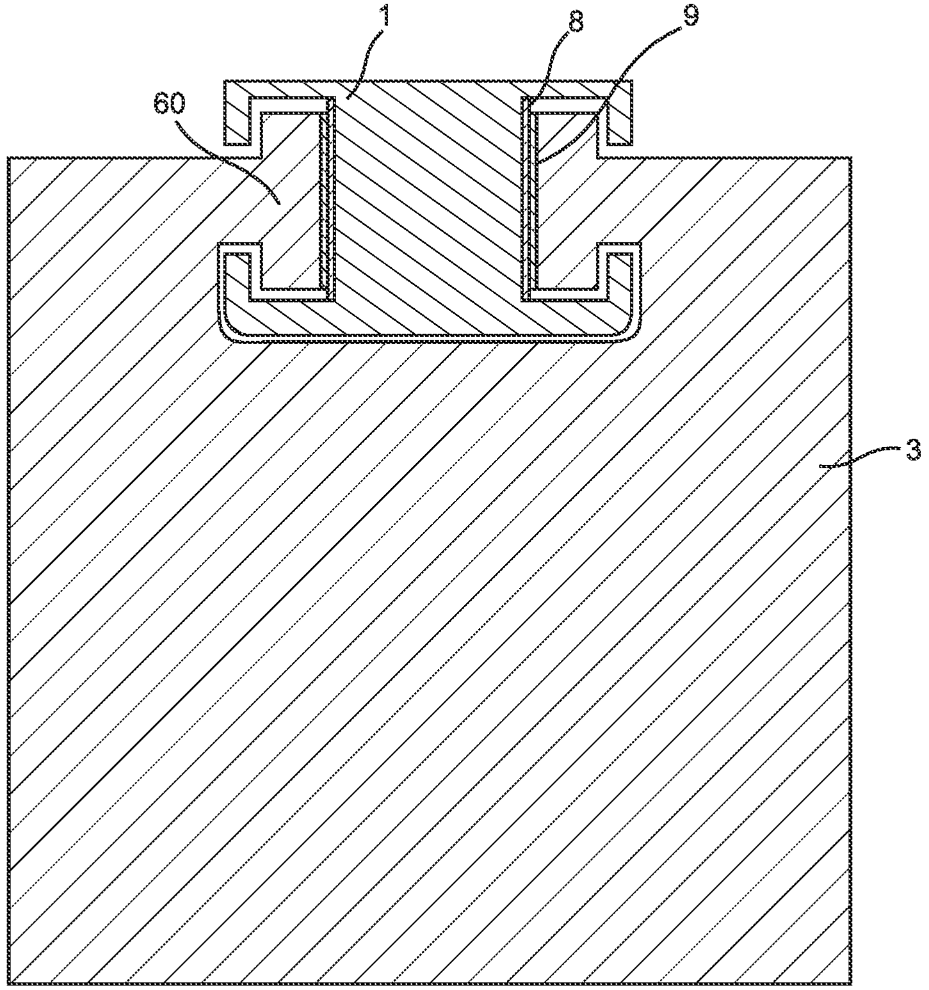
FIG. 5 illustrates the electronic communication/connection between the track and the slider.
Figure 6:
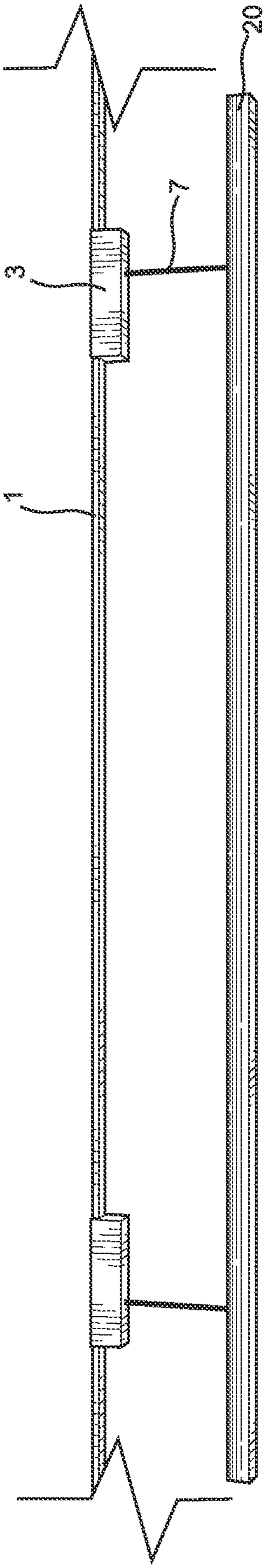
FIG. 6 illustrates a downlight attached to the track with sliders and support.
Figure 7:
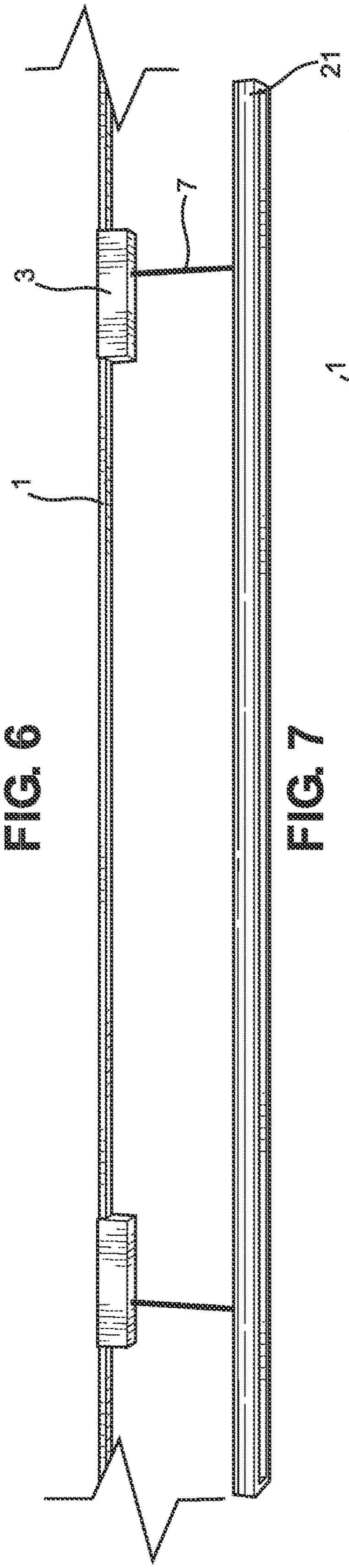
FIG. 7 illustrates a downlight attached to the track with sliders and suspenders.

FIG. 5 illustrates the electronic communication/connection between track 1 and the slider 3. Track 1 can have a square, rectangular, circular, or oval profile. As illustrated, track 1 is rectangular with a slot on each side, for a total of two. As illustrated, there is a slot on the left and right side of track 1.

The slots of track 1 can have a copper film/wire/foil 9. The flat copper wire 9, which can be a flat wire/film/foil, can run on the entire track 1 on each of the two slots. The flat copper wire 9 can be placed on its height and run horizontally parallel to track 1. An electrical connection can be made with the flat copper wire 9 at any point on track 1. A slider 3 can be placed at any position on the track 1. The slider 3 can have a complementary slot for track 1. Slider 3 can have two arms 60 that come inside of the slot of the track 1. The end of the arms 60 can have two copper wires 8 that come in contact with the copper wire 9 of the track and make an electrical connection.

Figure 13:
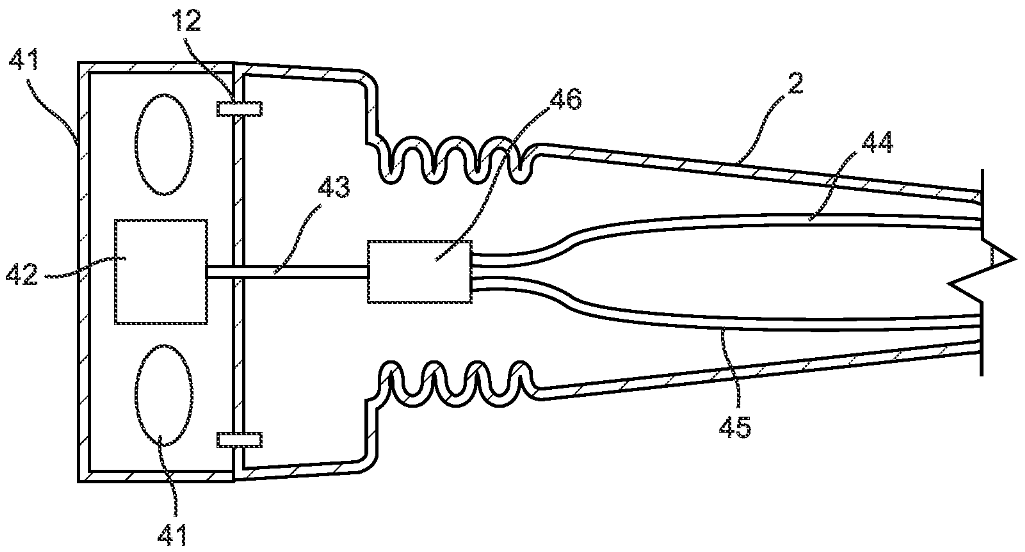
FIG. 13 illustrates inside of the cover at the ends.

FIG. 13 illustrates the track system inside of cover 2 and junction box 4, which can be attached to each other with fastener 12. Fastener 12 may be the same or different than fastener 30. Junction box 4 can have one or more openings 41 on the sides and can be placed behind wall 5. Junction box 4 can be made form steel. A ballast, driver and/or other electronics to power and regulate the electricity flow can be placed in housing 42 inside of the junction box 4. Housing 42 contains the wires and electronics. As illustrated, wire 43 enters housing 46 and wires 44 and 45 leave/enter housing 46. In one embodiment, junction box 4 is not used, and the driver/ballast is placed inside of housing 46.

Figure 14:
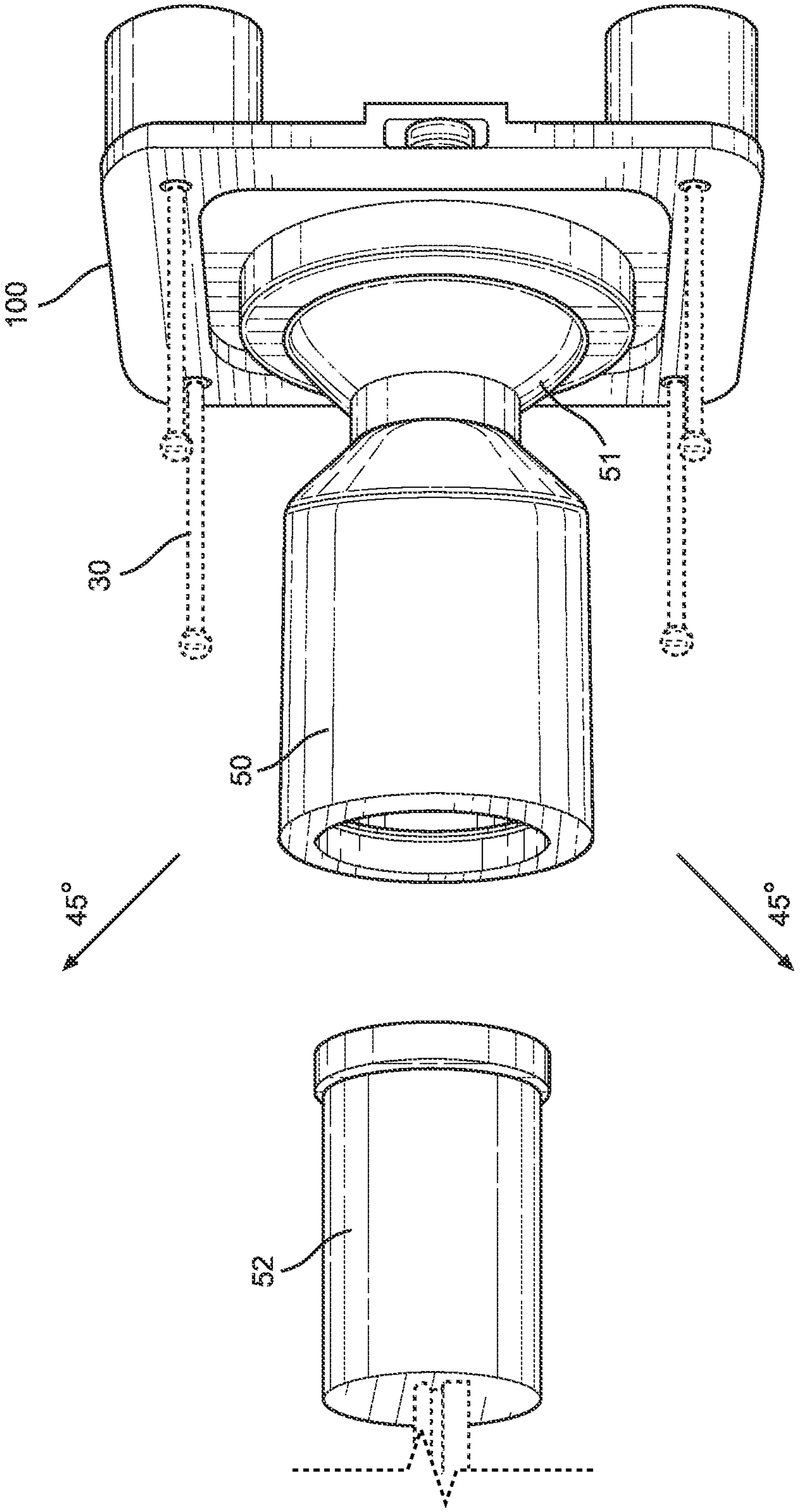
FIG. 14 illustrates the base at the end for attachment to the track.
Figure 15:
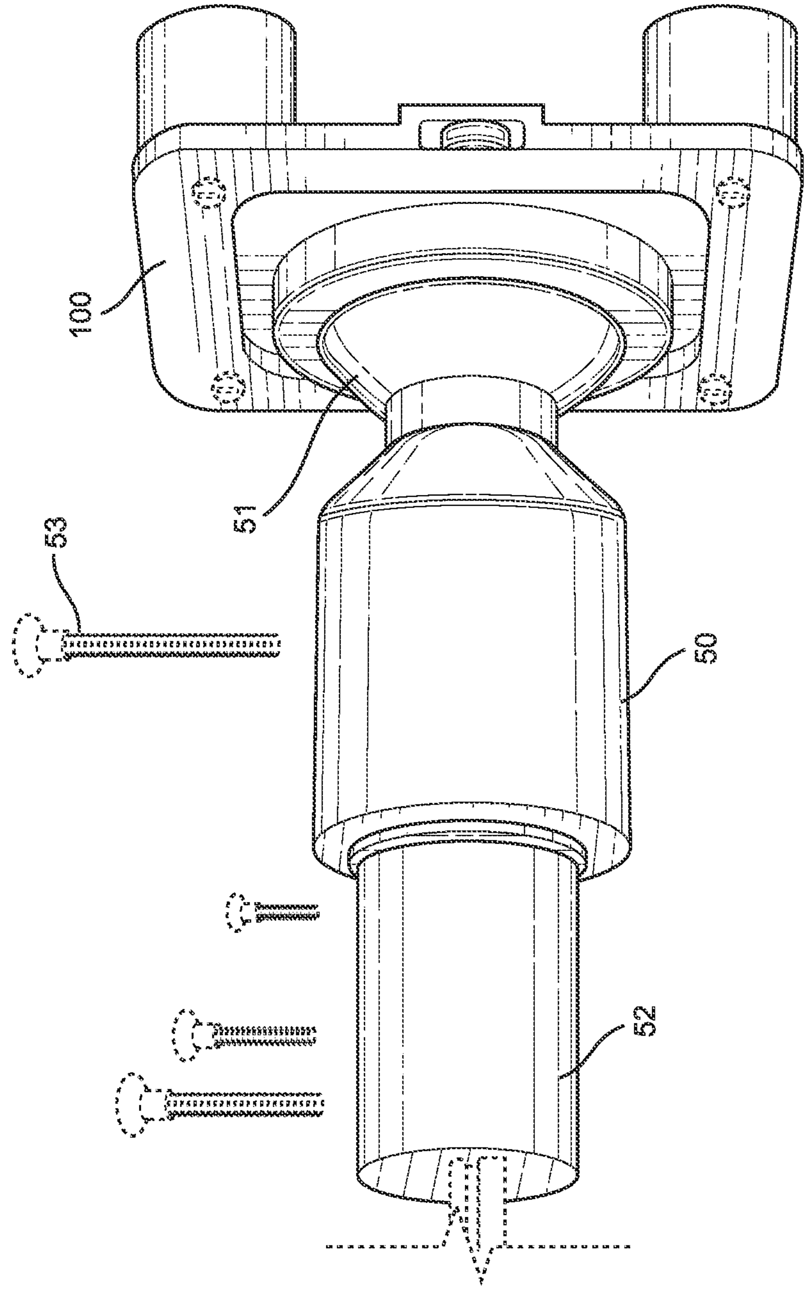
FIG. 15 illustrates the base at the end for attachment to the track.

FIGS. 14 and 15 illustrate the base 100 at each end of the track 1 under the cover 2. The base can have a cylinder 52 that is placed inside of receiver 50 and fastened to each other with fasteners 53. A turnbuckle system can be used where track 1 is attached with a turnbuckle to base 100, allowing for movement in an angular direction. The spherical member 51 allows for movement of receiver up to 45 degrees in any direction, allowing attachment of track 1 with an angle in any 360 degrees direction. Bracket 13 can be placed at the end of base 100 to create a gap to allow movement for the spherical member 51.

Track 1 can be made from ABS (Acrylonitrile butadiene styrene) on the outside and stainless-steel strip on the inside. The Track System's luminaires can be equipped with 2-step McAdam Eclipse LEDs and 90+CRI. The LEDs can be in a variety of kelvin temperature options: 2700K, 3000K, 3500K, 4000K, 5000K. The tracks system (from end 13 to end 13) can have a length of, less than 100 feet, such as 20 feet to 65 feet, and be adjustable. The track system can carry a load of up to 70 lbs. The track system can have a wattage of 100. The track system can be installed with a maximum 45 degrees in any direction between walls. The track system can use a turnbuckle mounting (FIG. 14), which allows for attached at an angle of up to 45 degrees.

Track 1 is available in two options for desired amount of indirect lighting: with and without uplighting. Track 1 with uplighting provides soft and aesthetic illumination for an alluring effect. Track 1 without uplighting provides illumination focused beneath the fixture ideal for rooms requiring less light than the uplighting option, such as for lower ceilings.

The Track System is powered by constant voltage drivers with a rating of 50/60 Hz at a 120/277V input and a 48V output. They produce less than 20% THD, have a 90% power factor, and are thermally protected for additional safety. Driver wattage can be 100 W and can power up to 6 ft of track. Track drivers can be remotely mounted, and can be 0-10V 1% Dimming. Remote Mount Driver Options include: 0-10V dimming on either MVOLT 120, 277 Dimmable down to 1% of initial lumens: 60 W @ 120V or 85 W @ 277V.

The light fixtures attached to the track can include Track Heads Cylinder Pendant 26, Light Pendant 29, Globe 27, Pendant Diffused, Pendant Downlight, Linear, Linear Diffused, Linear Downlight, and Recessed.

The FT-T2-1 Cylinder 10 Track Heads are crafted with black interiors and narrow distribution 30°, narrow flood 37°, and flood 46° TIR optics, providing precise beam control and reducing glare. The optics can be field-changeable, with various lumen and distribution options.

Cylinder 26 track luminaires can have nearly a full range of motion with a rotational limit of 355° and a tilt range of 85° and rotate in relation to connector 7. The Cylinder 26 Track Heads can be crafted with black interiors and spot 20°, narrow flood 33°, and flood 41° TIR optics, providing precise beam control and reducing glare. The optics can be field-changeable, with various lumen and distribution options. Cylinder 26 Track luminaires can have nearly a full range of motion with a rotational limit of 355° and a tilt range of 85°.

The Cylinder 26 track heads can be crafted with black interiors and spot 20°, narrow flood 33°, and flood 41° TIR optics, providing precise beam control and reducing glare. The optics are field-changeable, with various lumen and distribution options. Cylinder 26 Track luminaires have nearly a full range of motion with a rotational limit of 355° and a tilt range of 85°. The luminaire serves as an excellent task or accent light.

Figure 10:
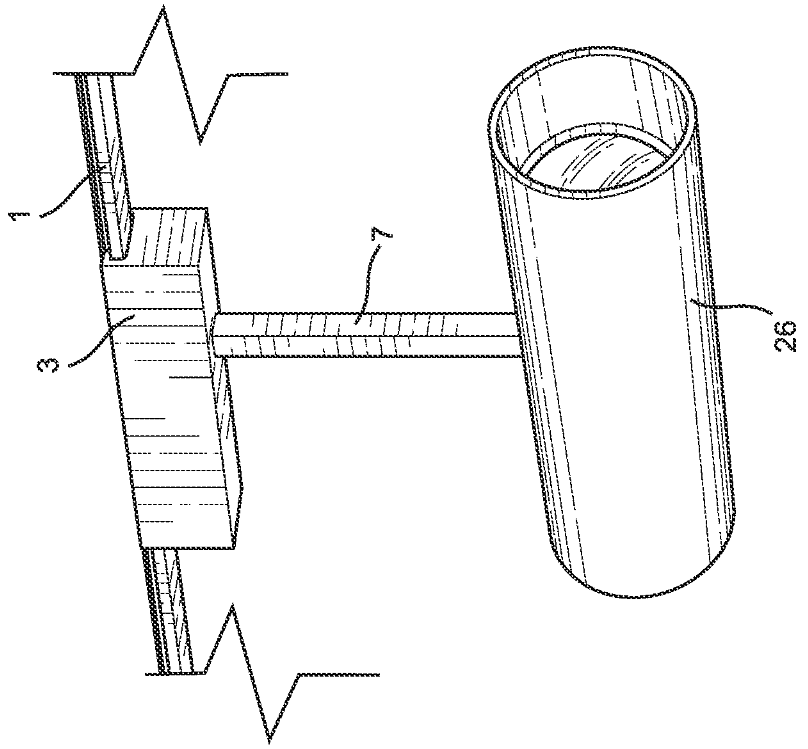
FIG. 10 illustrates a light with a ratable cylindrical lighting fixture.

The Cylinder 26 Pendant Luminaires (FIG. 10) can be crafted with black interiors and spot, narrow flood, and flood TIR optics, providing precise beam control and reducing glare. The optics are field-changeable, with various lumen and distribution options. Track Cylinder 26 Pendant luminaires are equipped with a standard 60" length wire that can be customized. The Cylinder 26 can be attached to a fixed support 27 that is rotatable.

The Linear Diffused luminaires (such as 15, 20, 21, and 25, FIGS. 6, 7, 8, and 9) easily integrates into the track system and is designed with a minimal profile from the track for a clean, sophisticated look. The Diffused luminaire is the ideal choice for dynamic design and general illumination in a sleek and modern location. The Linear Diffused luminaire (such as 15, 20, 21, and 25, FIGS. 6, 7, 8, and 9) can be installed individually or combined with other Track system track luminaires to create the perfect design. Multiple fixtures can be mounted next to each other on one track for a continuous ray of illumination.

Figure 8:
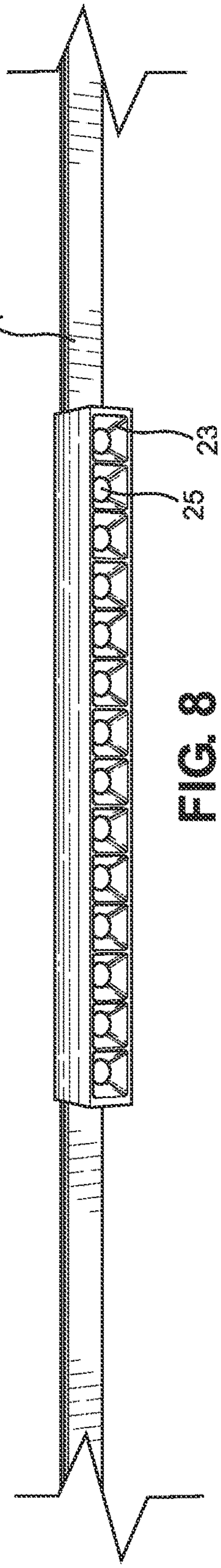
FIG. 8 illustrates a downlight where the downlight is attached directly to the track.
Figure 9:
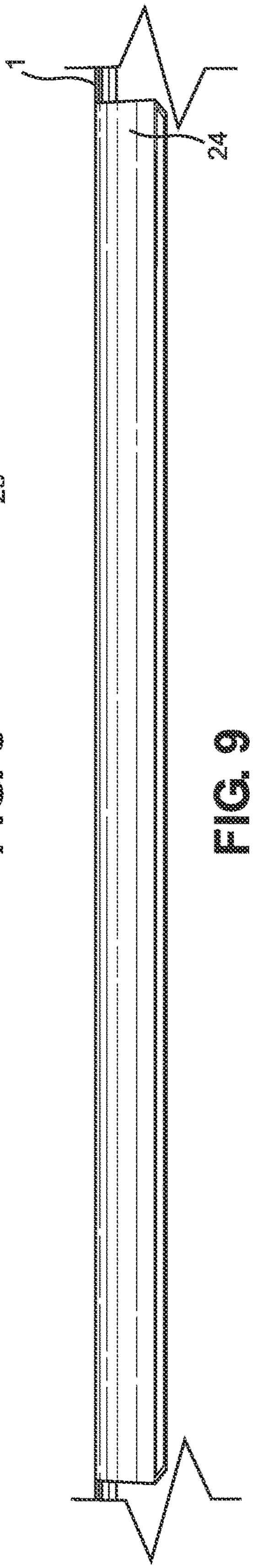
FIG. 9 illustrates a downlight where the downlight is attached directly to the track.

In FIGS. 8 and 9, the linear light 23 and 24 respectively are attached directly to the track 1 without use of a connector 7. The housing of the light fixture can have the same profile illustrated in FIG. 5 and be slidable for direct attachment. In this embodiment, slider 3 also serves as a light housing, housing optics. The linear light 23 can have optics 25 placed below LED light sources, and be attached to any position of the track 1, including upwards.

The Downlight luminaire (such as 15, 20, 21, and 25, FIGS. 6, 7, 8, and 9) easily integrates into a track system and is designed with a minimal profile from the track for a clean, sophisticated look. The Downlight luminaire can be installed individually or combined with other Track system track luminaires to create the perfect design. Multiple fixtures can be mounted next to each other on one track for a continuous ray of illumination. The Downlight luminaire is equipped with your choice of 30° narrow distribution, 42° flood, or 68° wide flood TIR optics, ideal for a wide variety of applications, and provides glare-free illumination ideal for downlight and task lighting applications.

Figure 12:
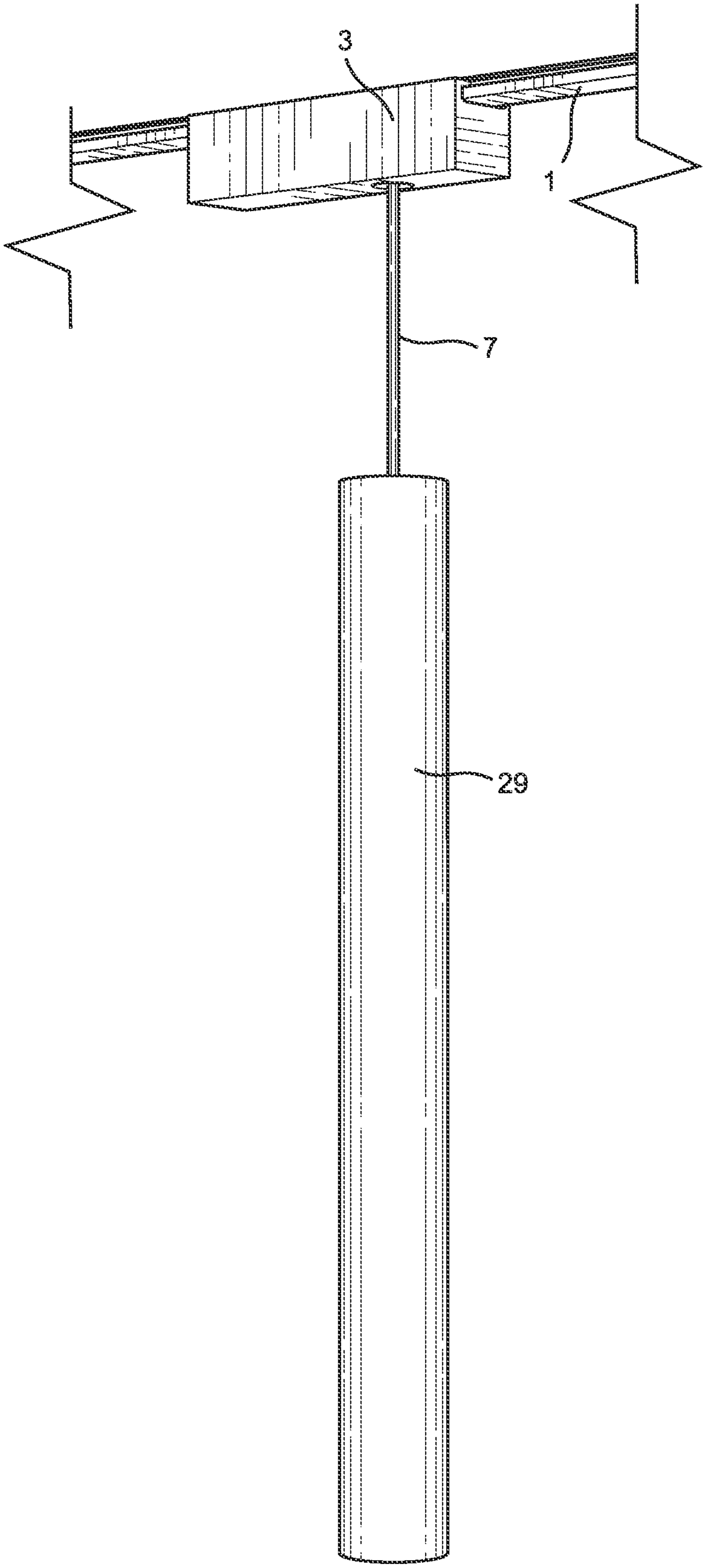
FIG. 12 illustrates a pendent light.

A Pendant Downlight (29, FIG. 12) luminaire can be equipped with a 60" adjustable suspension system and provides glare-free illumination ideal for task lighting applications, such as brightening a conference table or any other surface. The luminaire can be equipped with 26° narrow distribution, 36° narrow flood, or 54° flood TIR optics, suitable for a wide variety of applications, and provides glare-free illumination ideal for downlight and task lighting applications. A Pendant Diffused luminaire can be equipped with a 60" adjustable suspension system which easily integrates into the track system.

Figure 11:
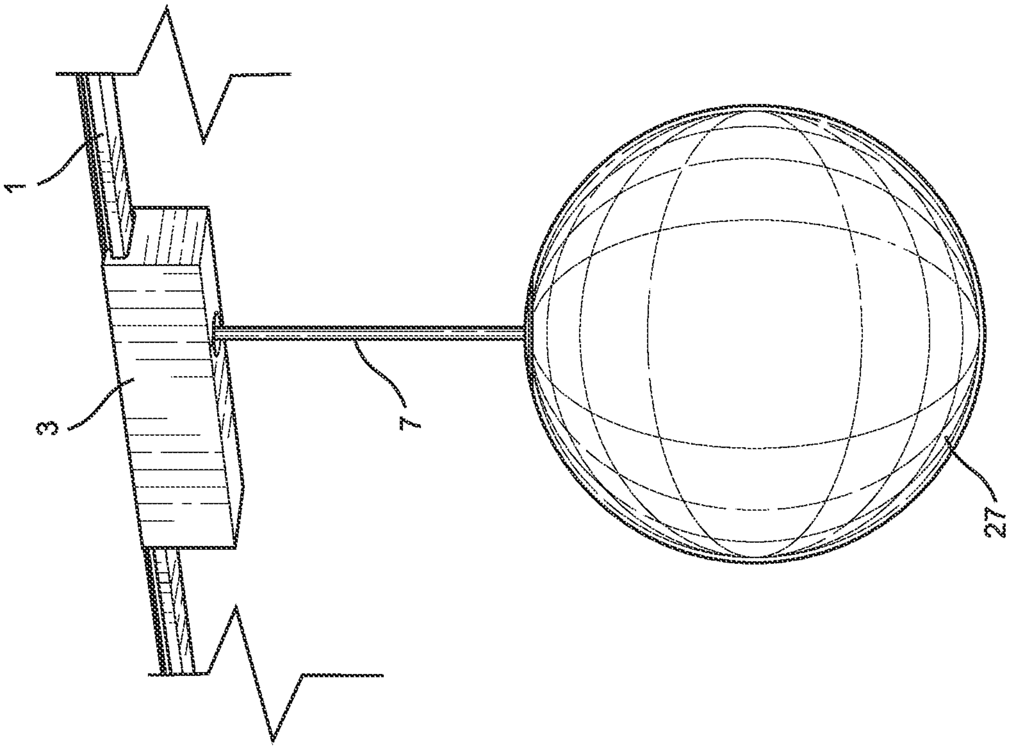
FIG. 11 illustrates a pendent globe light.

The Pendant Globe 27 Luminaire (FIG. 11) is designed with a unique spherical construction that can be utilized to provide a soft glow and elegantly illuminate your space. The Globe illuminates the entirety of its spherical light without obstruction. This fixture is equipped with a 60" length wire to suspend the luminaire that can be customized. This decorative piece can be installed individually or combined with other track system luminaires.

What is claimed is:

1. A track system to support and power light fixtures comprising:

a. a track having a length of less than 100 feet;

b. an electrical conductor running along the track;

c. two ends, each of the two ends placed at one end of the track, each of the two ends attached to a support, wherein the support is only attached to the track at each of the two ends, and wherein the track is suspended from the support;

wherein the track is configured for attachment of light fixtures and delivery of electricity to the light fixture though a connection with the electrical conductor.

2. The track system of claim 1, further comprising a total of two covers, one cover for each of the two ends.

3. The track system of claim 2, wherein the cover has a body portion and a cap portion connected to each other with a plurality of ridges.

4. The track system of claim 1, wherein each of the two ends comprises a metal bracket.

5. The track system of claim 4, wherein each bracket has an opening for passage of a wire.

6. The track system of claim 1, wherein the track is made from ABS (Acrylonitrile butadiene styrene) on outside and stainless-steel strip inside.

7. The track system of claim 1, further comprising a slider configured to be positioned along the track, the slider further comprising a complementary conductor to the electrical conductor of the track.

8. The track system of claim 1, further comprising a connector attached to the slider for attaching a light fixture.

9. The track system of claim 1, wherein the light fixture is attached directly to the track.

10. The track system of claim 1, wherein the track has two slots on each side, with a first and a second electrical conductor running on each slot.

11. The track system of claim 1, wherein the track comprises a receiver at each of the two ends configured for spherical movement.

12. The track system of claim 1, further comprising a junction box for housing a driver, the junction box placed outside of the ends of the track.

13. The track system of claim 1, further comprising a wiring housing inside of the cover.

14. The track system of claim 1, wherein the electrical conductor is a flat copper wire, with a thickness of less than 2 mm and a width (horizontal to track) of less than two inches.

15. The track system of claim 1, wherein the track has two slots, with conductors running along both slots.

16. A track system to support and power light fixtures comprising:

a. a track having a length of less than 100 feet and having two slots;

b. an electrical conductor running along the two slots of the track on opposite sides of the track;

c. two ends, each of the two ends placed at one end of the track, each of the two ends having a spherical member to allow for movement relative to a base;

d. one or more sliders, the sliders configured to slide on the track and make an electrical connection with the track;

e. a total of two covers, one cover for each end.

17. The track system of claim 16, wherein the cover has a body portion and a cap portion connected to each other with a plurality of ridges.

18. The track system of claim 16, therein the track has two slots, and the slider has two arms, each arm having a conductor making an electrical connection with the conductor in the slots of the track.

19. The track system of claim 16, wherein each of the two ends of the track is attached to the base in a configuration that allows movement in any direction at an angle of 20 to 60 degrees.

* * * * *